US011481829B2

(12) United States Patent
Bostock et al.

(10) Patent No.: US 11,481,829 B2
(45) Date of Patent: Oct. 25, 2022

(54) METHOD, SYSTEM, AND COMPUTER PROGRAM PRODUCT FOR PROVIDING PRODUCT DATA AND/OR RECOMMENDATIONS

(71) Applicant: Visa International Service Association, San Francisco, CA (US)

(72) Inventors: James McDonald Bostock, San Mateo, CA (US); Lisa Hammitt, San Francisco, CA (US)

(73) Assignee: Visa International Service Association, San Francisco, CA (US)

(*) Notice: Subject to any disclaimer, the term of this patent is extended or adjusted under 35 U.S.C. 154(b) by 411 days.

(21) Appl. No.: 16/508,675

(22) Filed: Jul. 11, 2019

(65) Prior Publication Data

US 2020/0020017 A1   Jan. 16, 2020

Related U.S. Application Data

(60) Provisional application No. 62/696,564, filed on Jul. 11, 2018.

(51) Int. Cl.
*G06Q 30/00* (2012.01)
*G06Q 30/06* (2012.01)
*G06Q 30/02* (2012.01)
*G06F 16/9535* (2019.01)

(52) U.S. Cl.
CPC ..... *G06Q 30/0631* (2013.01); *G06F 16/9535* (2019.01); *G06Q 30/0247* (2013.01); *G06Q 30/0256* (2013.01); *G06Q 30/0625* (2013.01)

(58) Field of Classification Search
CPC .......... G06Q 30/0631; G06Q 30/0247; G06Q 30/0256; G06Q 30/0625; G06F 16/9535
USPC ............................................. 705/26, 27, 4, 2
See application file for complete search history.

(56) References Cited

U.S. PATENT DOCUMENTS 7,315,861 B2   1/2008 Seibel et al.
7,330,850 B1   2/2008 Seibel et al.
8,374,906 B1   2/2013 Williams et al.
(Continued)

OTHER PUBLICATIONS

"Impact of an "online-to-store" channel on demand allocation, pricing and profitability," Cao et al., European Journal of Operational Research, Jul. 2015, Google Scholar, 12pgs. (Year: 2015).*
(Continued)

*Primary Examiner* — Robert M Pond
(74) *Attorney, Agent, or Firm* — The Webb Law Firm

(57) ABSTRACT

Provided is a method for providing product data to a user. The method may include receiving query data associated with a plurality of queries of a database by a user. A classification for at least two queries of the plurality of queries may be determined. A product associated with the classification of the at least two queries may be determined. A potential revenue associated with the product may be calculated based on the user. A probability that the user will purchase the product may be calculated. A score may be calculated based on the potential revenue and the probability that the user will purchase the product. Product data associated with the product may be transmitted to the user if the score exceeds a threshold. A system and computer program product are also disclosed.

19 Claims, 6 Drawing Sheets

(56) References Cited

U.S. PATENT DOCUMENTS

| | | | |
|---|---|---|---|
| 8,838,587 B1* | 9/2014 | Adams | G06F 16/951 |
| | | | 707/731 |
| 9,460,455 B2 | 10/2016 | Hardeniya et al. | |
| 10,198,762 B1* | 2/2019 | Dangaltchev | G06Q 30/02 |
| 2002/0004735 A1* | 1/2002 | Gross | G06Q 30/0214 |
| | | | 705/26.41 |
| 2007/0294192 A1 | 12/2007 | Tellefsen | |
| 2013/0211877 A1 | 8/2013 | Kushkuley et al. | |
| 2016/0171113 A1 | 6/2016 | Fanous et al. | |

OTHER PUBLICATIONS

"A Conceptual Model for Determining Factors Influencing Online Purchase Behavior," Deka et al., Journal of Management in Practice v2n1 May 2017, 15pgs. (Year: 2017).*

Ferreira et al., "Analytics for an Online Retailer: Demand Forecasting and Price Optimization", Manufacturing & Service Operations Management, 2015, 41 pages, vol. 18, No. 1.

Rajagopal, "Customer Data Clustering using Data Mining Technique", International Journal of Database Management Systems (IJDMS), 2011, 11 pages, vol. 3, No. 4.

Simchi-Levi, "The New Frontier of Price Optimization", MIT Sloan Management Review, 2017, 8 pages, vol. 59, No. 1.

\* cited by examiner

METHOD, SYSTEM, AND COMPUTER PROGRAM PRODUCT FOR PROVIDING PRODUCT DATA AND/OR RECOMMENDATIONS

CROSS-REFERENCE TO RELATED APPLICATIONS

This application claims priority to U.S. Provisional Patent Application No. 62/696,564, filed Jul. 11, 2018, the disclosure of which is hereby incorporated by reference in its entirety.

BACKGROUND

1. Field

This disclosed subject matter relates generally to methods, systems, and products for providing product data and/or recommendations and, in some particular embodiments or aspects, to a method, system, and computer program product for providing product data and/or recommendations based on database queries and/or transaction data.

2. Technical Considerations

Certain customers (e.g., merchant customers of a transaction service provider) may not communicate their needs. Additionally or alternatively, certain customers may not be aware of products and/or services that may be able to meet such needs. As such, it may be difficult for a product and/or service provider (e.g., transaction service provider) to identify products and/or services that may be useful to the customers. Additionally or alternatively, it may be difficult for the product and/or service provider to effectively market such products and/or services to the customers. Accordingly, opportunities to recommend and/or market such products to the customers may be lost.

Additionally or alternatively, certain customers (e.g., small to medium-sized business customers of a transaction service provider) may lack time and/or resources to effectively monitor and/or handle administrative aspects (e.g., of their respective businesses). For example, determinations regarding pricing (e.g., of products), inventory management (e.g., what inventory to hold), product trends (e.g., identifying the latest product trends), marketing (e.g., how and to whom products should be marketed), sales/discount offers (e.g., when to hold sales), and/or the like may be time consuming and/or difficult for such customers. Accordingly, such customers may miss opportunities and/or fail to take advantage of trends, and revenue and/or profit margins of such customers may slip.

SUMMARY

Accordingly, it is an object of the presently disclosed subject matter to provide methods, systems, and computer program products for providing product data and/or recommendations.

According to non-limiting embodiments or aspects, provided is a method for providing product data to a user. In some non-limiting embodiments or aspects, a method for providing product data to a user may include receiving query data associated with a plurality of queries of a database by a user. A classification for at least two queries of the plurality of queries may be determined. A product associated with the classification of the at least two queries of the plurality of queries may be determined. A potential revenue associated with the product may be calculated based on the user. A probability that the user will purchase the product may be calculated. A score may be calculated based on the potential revenue and the probability that the user will purchase the product. Product data associated with the product may be transmitted to the user if the score exceeds a threshold.

In some non-limiting embodiments or aspects, user data associated with the user and user category data associated with a category of the user may be received. Additionally or alternatively, the probability that the user will purchase the product may be calculated based on the user data, the user category data, and a cost of the product. Additionally or alternatively, the potential revenue may be calculated based on the user data, the user category data, and a cost of the product. Additionally or alternatively, user data may include at least one of user identification data identifying the user, location data identifying a location of the user, user revenue data associated with a revenue of the user, user size data associated with a size of the user, transaction data associated with a plurality of payment transactions from the user, purchase history data associated with purchases previously made by the user, any combination thereof, and/or the like. Additionally or alternatively, the user category data may include at least one of category code data identifying the category code of the user, other user identification data identifying other users associated with the category of the user, other user purchase history data associated with purchases previously made by the other users in the category, any combination thereof, and/or the like.

According to non-limiting embodiments or aspects, provided is a system for providing product data to a user. In some non-limiting embodiments or aspects, the system for providing product data to a user may include at least one first computing device, which may transmit query data associated with a plurality of queries of a database by a user. At least one second computing device may receive the query data associated with the plurality of queries of the database by the user. A classification for at least two queries of the plurality of queries may be determined (e.g., by the second computing device(s)). A product associated with the classification of the at least two queries may be determined (e.g., by the second computing device(s)). A potential revenue associated with the product may be calculated (e.g., by the second computing device(s)) based on the user. A probability that the user will purchase the product may be calculated (e.g., by the second computing device(s)). A score may be calculated (e.g., by the second computing device(s)) based on the potential revenue and the probability that the user will purchase the product. Product data associated with the product may be transmitted (e.g., by the second computing device(s)) to the first computing device(s) if the score exceeds a threshold. The first computing device(s) may further receive the product data associated with the product and display the product data to the user.

In some non-limiting embodiments or aspects, the at least one first computing device may include a merchant computing device of a merchant system. Additionally or alternatively, the at least one second computing device may include a transaction service provider device of a transaction service provider system.

In some non-limiting embodiments or aspects, user data associated with the user and user category data associated with a category of the user may be received. Additionally or alternatively, the probability that the user will purchase the product may be calculated based on the user data, the user category data, and a cost of the product. Additionally or alternatively, the potential revenue may be calculated based on the user data, the user category data, and a cost of the product. Additionally or alternatively, user data may include at least one of user identification data identifying the user, location data identifying a location of the user, user revenue data associated with a revenue of the user, user size data associated with a size of the user, transaction data associated with a plurality of payment transactions from the user, purchase history data associated with purchases previously made by the user, any combination thereof, and/or the like. Additionally or alternatively, the user category data may include at least one of category code data identifying the category code of the user, other user identification data identifying other users associated with the category of the user, other user purchase history data associated with purchases previously made by the other users in the category, any combination thereof, and/or the like.

According to non-limiting embodiments or aspects, provided is a computer program product for providing product data to a user. The computer program product may include at least one non-transitory computer-readable medium including one or more instructions that, when executed by at least one processor, cause the at least one processor to receive query data associated with a plurality of queries of a database by a user. A classification for at least two queries of the plurality of queries may be determined. A product associated with the classification of the at least two queries of the plurality of queries may be determined. A potential revenue associated with the product may be calculated based on the user. A probability that the user will purchase the product may be calculated. A score may be calculated based on the potential revenue and the probability that the user will purchase the product. Product data associated with the product may be transmitted to the user if the score exceeds a threshold.

In some non-limiting embodiments or aspects, user data associated with the user and user category data associated with a category of the user may be received. Additionally or alternatively, the probability that the user will purchase the product may be calculated based on the user data, the user category data, and a cost of the product. Additionally or alternatively, the potential revenue may be calculated based on the user data, the user category data, and a cost of the product. Additionally or alternatively, user data may include at least one of user identification data identifying the user, location data identifying a location of the user, user revenue data associated with a revenue of the user, user size data associated with a size of the user, transaction data associated with a plurality of payment transactions from the user, purchase history data associated with purchases previously made by the user, any combination thereof, and/or the like. Additionally or alternatively, the user category data may include at least one of category code data identifying the category code of the user, other user identification data identifying other users associated with the category of the user, other user purchase history data associated with purchases previously made by the other users in the category, any combination thereof, and/or the like.

According to non-limiting embodiments or aspects, provided is a method for providing at least one recommendation. The method for providing at least one recommendation may include receiving transaction data associated with a plurality of payment transactions from a plurality of merchants. Inventory data associated with a first merchant of the plurality of merchants may be received. Preference data associated with the first merchant may be received. At least one recommendation for the first merchant may be determined based on the transaction data, the inventory data, and the preference data. The at least one recommendation may be transmitted to the first merchant.

In some non-limiting embodiments or aspects, the at least one recommendation may include at least one of a recommended price for a product in an inventory of the first merchant, a recommendation to purchase a number of products for inclusion in the inventory of the first merchant, a recommended discount offer for a product in the inventory of the first merchant, a recommended cost for a product in the inventory of the first merchant, a recommended demographic target for advertising, a recommended geographic target for advertising, a recommended new location for selling a product in the inventory of the first merchant, a recommended new type of product to purchase for inclusion in the inventory of the first merchant, a recommended new type of payment to accept, any combination thereof, and/or the like.

In some non-limiting embodiments or aspects, the transaction data associated with each payment transaction of the plurality of payment transactions may include at least one of product identification data identifying a product, price data identifying a price of the product, merchant data identifying a merchant of the plurality of merchants, location data identifying a location of the merchant, time data identifying a time of the payment transaction, any combination thereof, and/or the like.

In some non-limiting embodiments or aspects, the inventory data may include product data associated with a plurality of products. Additionally or alternatively, the product data associated with each product of the plurality of products may include product identification data identifying the product. In some non-limiting embodiments or aspects, the inventory data may further include at least one of price data identifying a price of each product of the plurality of products, cost data identifying a cost of each product of the plurality of products, source data identifying a source of each product of the plurality of products, any combination thereof, and/or the like.

In some non-limiting embodiments or aspects, the preference data may include at least one of a target amount of revenue, a target amount of profit, a target number of products, a target margin between a sales price and a cost of a product, a target reduction in costs, a request for identification of a new type of product for inclusion in an inventory of the first merchant, a request for identification of a new location for selling a product in the inventory of the first merchant, any combination thereof, and/or the like.

According to non-limiting embodiments or aspects, provided is a system for providing at least one recommendation. The system for providing at least one recommendation may include a plurality of merchant computing devices of a plurality of merchants, including a first merchant computing device of a first merchant, and at least one transaction service provider device. Transaction data associated with a plurality of payment transactions from the plurality of merchant devices may be received (e.g., by the transaction service provider device(s)). Inventory data associated with the first merchant may be received (e.g., by the transaction service provider device(s)) from the first merchant computing device. Preference data associated with the first merchant may be received (e.g., by the transaction service provider device(s)) from the first merchant computing device. At least one recommendation for the first merchant may be determined (e.g., by the transaction service provider device(s)) based on the transaction data, the inventory data, and the preference data. The recommendation(s) may be transmitted (e.g., by the transaction service provider device(s)) to the first merchant computing device. The first merchant computing device may display the recommendation(s) to the first merchant.

In some non-limiting embodiments or aspects, the at least one recommendation may include at least one of a recommended price for a product in an inventory of the first merchant, a recommendation to purchase a number of products for inclusion in the inventory of the first merchant, a recommended discount offer for a product in the inventory of the first merchant, a recommended cost for a product in the inventory of the first merchant, a recommended demographic target for advertising, a recommended geographic target for advertising, a recommended new location for selling a product in the inventory of the first merchant, a recommended new type of product to purchase for inclusion in the inventory of the first merchant, a recommended new type of payment to accept, any combination thereof, and/or the like.

In some non-limiting embodiments or aspects, the transaction data associated with each payment transaction of the plurality of payment transactions may include at least one of product identification data identifying a product, price data identifying a price of the product, merchant data identifying a merchant of the plurality of merchants, location data identifying a location of the merchant, time data identifying a time of the payment transaction, any combination thereof, and/or the like.

In some non-limiting embodiments or aspects, the inventory data may include product data associated with a plurality of products. Additionally or alternatively, the product data associated with each product of the plurality of products may include product identification data identifying the product. In some non-limiting embodiments or aspects, the inventory data may further include at least one of price data identifying a price of each product of the plurality of products, cost data identifying a cost of each product of the plurality of products, source data identifying a source of each product of the plurality of products, any combination thereof, and/or the like.

In some non-limiting embodiments or aspects, the preference data may include at least one of a target amount of revenue, a target amount of profit, a target number of products, a target margin between a sales price and a cost of a product, a target reduction in costs, a request for identification of a new type of product for inclusion in an inventory of the first merchant, a request for identification of a new location for selling a product in the inventory of the first merchant, any combination thereof, and/or the like.

According to non-limiting embodiments or aspects, provided is a computer program product for providing at least one recommendation. The computer program product may include at least one non-transitory computer-readable medium including one or more instructions that, when executed by at least one processor, cause the at least one processor to receive transaction data associated with a plurality of payment transactions from a plurality of merchants. Inventory data associated with a first merchant of the plurality of merchants may be received. Preference data associated with the first merchant may be received. At least one recommendation for the first merchant may be determined based on the transaction data, the inventory data, and the preference data. The at least one recommendation may be transmitted to the first merchant.

In some non-limiting embodiments or aspects, the at least one recommendation may include at least one of a recommended price for a product in an inventory of the first merchant, a recommendation to purchase a number of products for inclusion in the inventory of the first merchant, a recommended discount offer for a product in the inventory of the first merchant, a recommended cost for a product in the inventory of the first merchant, a recommended demographic target for advertising, a recommended geographic target for advertising, a recommended new location for selling a product in the inventory of the first merchant, a recommended new type of product to purchase for inclusion in the inventory of the first merchant, a recommended new type of payment to accept, any combination thereof, and/or the like.

In some non-limiting embodiments or aspects, the transaction data associated with each payment transaction of the plurality of payment transactions may include at least one of product identification data identifying a product, price data identifying a price of the product, merchant data identifying a merchant of the plurality of merchants, location data identifying a location of the merchant, time data identifying a time of the payment transaction, any combination thereof, and/or the like.

In some non-limiting embodiments or aspects, the inventory data may include product data associated with a plurality of products. Additionally or alternatively, the product data associated with each product of the plurality of products may include product identification data identifying the product. In some non-limiting embodiments or aspects, the inventory data may further include at least one of price data identifying a price of each product of the plurality of products, cost data identifying a cost of each product of the plurality of products, source data identifying a source of each product of the plurality of products, any combination thereof, and/or the like.

In some non-limiting embodiments or aspects, the preference data may include at least one of a target amount of revenue, a target amount of profit, a target number of products, a target margin between a sales price and a cost of a product, a target reduction in costs, a request for identification of a new type of product for inclusion in an inventory of the first merchant, a request for identification of a new location for selling a product in the inventory of the first merchant, any combination thereof, and/or the like.

Further embodiments or aspects are set forth in the following numbered clauses:

Clause 1: A method for providing product data to a user, comprising: receiving, with at least one processor, query data associated with a plurality of queries of a database by a user; determining, with the at least one processor, a classification for at least two queries of the plurality of queries; determining, with the at least one processor, a product associated with the classification of the at least two queries of the plurality of queries; calculating, with the at least one processor, a potential revenue associated with the product based on the user; calculating, with the at least one processor, a probability that the user will purchase the product; calculating, with the at least one processor, a score based on the potential revenue and the probability that the user will purchase the product; and transmitting, with the at least one processor, product data associated with the product to the user if the score exceeds a threshold.

Clause 2: The method of clause 1, further comprising receiving user data associated with the user and user category data associated with a category of the user.

Clause 3: The method of any preceding clause, wherein the probability that the user will purchase the product is calculated based on the user data, the user category data, and a cost of the product.

Clause 4: The method of any preceding clause, wherein the potential revenue is calculated based on the user data, the user category data, and a cost of the product.

Clause 5: The method of any preceding clause, wherein user data comprises at least one of user identification data identifying the user, location data identifying a location of the user, user revenue data associated with a revenue of the user, user size data associated with a size of the user, transaction data associated with a plurality of payment transactions from the user, purchase history data associated with purchases previously made by the user, or any combination thereof.

Clause 6: The method of any preceding clause, wherein the user category data comprises at least one of category code data identifying the category code of the user, other user identification data identifying other users associated with the category of the user, other user purchase history data associated with purchases previously made by the other users in the category, or any combination thereof.

Clause 7: A computer program product for providing product data to a user, the computer program product comprising at least one non-transitory computer-readable medium including one or more instructions that, when executed by at least one processor, cause the at least one processor to: receive query data associated with a plurality of queries of a database by a user; determine a classification for at least two queries of the plurality of queries; determine a product associated with the classification of the at least two queries of the plurality of queries; calculate a potential revenue associated with the product based on the user; calculate a probability that the user will purchase the product; calculate a score based on the potential revenue and the probability that the user will purchase the product; and transmit product data associated with the product to the user if the score exceeds a threshold.

Clause 8: The computer program product of clause 7, wherein the one or more instructions further cause the at least one processor to receive user data associated with the user and user category data associated with a category of the user.

Clause 9: The computer program product of clause 7 or 8, wherein the probability that the user will purchase the product is calculated based on the user data, the user category data, and a cost of the product.

Clause 10: The computer program product of any one of clauses 7-9, wherein the potential revenue is calculated based on the user data, the user category data, and a cost of the product.

Clause 11: The computer program product of any one of clauses 7-10, wherein user data comprises at least one of user identification data identifying the user, location data identifying a location of the user, user revenue data associated with a revenue of the user, user size data associated with a size of the user, transaction data associated with a plurality of payment transactions from the user, purchase history data associated with purchases previously made by the user, or any combination thereof.

Clause 12: The computer program product of any one of clauses 7-11, wherein the user category data comprises at least one of category code data identifying the category code of the user, other user identification data identifying other users associated with the category of the user, other user purchase history data associated with purchases previously made by the other users in the category, or any combination thereof.

Clause 13: A system for providing product data to a user, comprising: at least one first computing device, configured to: transmit query data associated with a plurality of queries of a database by a user; and at least one second computing device, configured to: receive the query data associated with the plurality of queries of the database by the user; determine a classification for at least two queries of the plurality of queries; determine a product associated with the classification of the at least two queries of the plurality of queries; calculate a potential revenue associated with the product based on the user; calculate a probability that the user will purchase the product; calculate a score based on the potential revenue and the probability that the user will purchase the product; and transmit product data associated with the product to the at least one first computing device if the score exceeds a threshold, wherein the at least one first computing device is further configured to: receive the product data associated with the product; and display the product data to the user.

Clause 14: The system of clause 13, wherein the at least one first computing device comprises a merchant computing device of a merchant system, and further wherein the at least one second computing device comprises a transaction service provider device of a transaction service provider system.

Clause 15: The system of clause 13 or 14, wherein the at least one second computing device is further configured to receive user data associated with the user and user category data associated with a category of the user.

Clause 16: The system of any one of clauses 13-15, wherein the probability that the user will purchase the product is calculated based on the user data, the user category data, and a cost of the product.

Clause 17: The system of any one of clauses 13-16, wherein the potential revenue is calculated based on the user data, the user category data, and a cost of the product.

Clause 18: The system of any one of clauses 13-17, wherein user data comprises at least one of user identification data identifying the user, location data identifying a location of the user, user revenue data associated with a revenue of the user, user size data associated with a size of the user, transaction data associated with a plurality of payment transactions from the user, purchase history data associated with purchases previously made by the user, or any combination thereof.

Clause 19: The system of any one of clauses 13-18, wherein the user category data comprises at least one of category code data identifying the category code of the user, other user identification data identifying other users associated with the category of the user, other user purchase history data associated with purchases previously made by the other users in the category, or any combination thereof.

Clause 20: A method for providing at least one recommendation, comprising: receiving, with at least one processor, transaction data associated with a plurality of payment transactions from a plurality of merchants; receiving, with the at least one processor, inventory data associated with a first merchant of the plurality of merchants; receiving, with the at least one processor, preference data associated with the first merchant of the plurality of merchants; determining, with at least one processor, at least one recommendation for the first merchant based on the transaction data, the inventory data, and the preference data; and transmitting, with at least one processor, the at least one recommendation to the first merchant.

Clause 21: The method of clause 20, wherein the at least one recommendation comprises at least one of a recommended price for a product in an inventory of the first merchant, a recommendation to purchase a number of products for inclusion in the inventory of the first merchant, a recommended discount offer for a product in the inventory of the first merchant, a recommended cost for a product in the inventory of the first merchant, a recommended demographic target for advertising, a recommended geographic target for advertising, a recommended new location for selling a product in the inventory of the first merchant, a recommended new type of product to purchase for inclusion in the inventory of the first merchant, a recommended new type of payment to accept, or any combination thereof.

Clause 22: The method of clause 20 or 21, wherein the transaction data associated with each payment transaction of the plurality of payment transactions comprises at least one of product identification data identifying a product, price data identifying a price of the product, merchant data identifying a merchant of the plurality of merchants, location data identifying a location of the merchant, time data identifying a time of the payment transaction, or any combination thereof.

Clause 23: The method of any one of clauses 20-22, wherein the inventory data comprises product data associated with a plurality of products, the product data associated with each product of the plurality of products comprising product identification data identifying the product.

Clause 24: The method of any one of clauses 20-23, wherein the inventory data further comprises at least one of price data identifying a price of each product of the plurality of products, cost data identifying a cost of each product of the plurality of products, source data identifying a source of each product of the plurality of products, or any combination thereof.

Clause 25: The method of any one of clauses 20-24, wherein the preference data comprises at least one of a target amount of revenue, a target amount of profit, a target number of products, a target margin between a sales price and a cost of a product, a target reduction in costs, a request for identification of a new type of product for inclusion in an inventory of the first merchant, a request for identification of a new location for selling a product in the inventory of the first merchant, or any combination thereof.

Clause 26: A computer program product for providing at least one recommendation, the computer program product comprising at least one non-transitory computer-readable medium including one or more instructions that, when executed by at least one processor, cause the at least one processor to: receive transaction data associated with a plurality of payment transactions from a plurality of merchants; receive inventory data associated with a first merchant of the plurality of merchants; receive preference data associated with the first merchant of the plurality of merchants; determine at least one recommendation for the first merchant based on the transaction data, the inventory data, and the preference data; and transmit the at least one recommendation to the first merchant.

Clause 27: The computer program product of clause 26, wherein the at least one recommendation comprises at least one of a recommended price for a product in an inventory of the first merchant, a recommendation to purchase a number of products for inclusion in the inventory of the first merchant, a recommended discount offer for a product in the inventory of the first merchant, a recommended cost for a product in the inventory of the first merchant, a recommended demographic target for advertising, a recommended geographic target for advertising, a recommended new location for selling a product in the inventory of the first merchant, a recommended new type of product to purchase for inclusion in the inventory of the first merchant, a recommended new type of payment to accept, or any combination thereof.

Clause 28: The computer program product of clause 26 or 27, wherein the transaction data associated with each payment transaction of the plurality of payment transactions comprises at least one of product identification data identifying a product, price data identifying a price of the product, merchant data identifying a merchant of the plurality of merchants, location data identifying a location of the merchant, time data identifying a time of the payment transaction, or any combination thereof.

Clause 29: The computer program product of any one of clauses 26-28, wherein the inventory data comprises product data associated with a plurality of products, the product data associated with each product of the plurality of products comprising product identification data identifying the product.

Clause 30: The computer program product of any one of clauses 26-29, wherein the inventory data further comprises at least one of price data identifying a price of each product of the plurality of products, cost data identifying a cost of each product of the plurality of products, source data identifying a source of each product of the plurality of products, or any combination thereof.

Clause 31: The computer program product of any one of clauses 26-30, wherein the preference data comprises at least one of a target amount of revenue, a target amount of profit, a target number of products, a target margin between a sales price and a cost of a product, a target reduction in costs, a request for identification of a new type of product for inclusion in an inventory of the first merchant, a request for identification of a new location for selling a product in the inventory of the first merchant, or any combination thereof.

Clause 32: A system for providing at least one recommendation, comprising: a plurality of merchant computing devices of a plurality of merchants including a first merchant computing device of a first merchant; and at least one transaction service provider device configured to: receive transaction data associated with a plurality of payment transactions from the plurality of merchant computing devices; receive inventory data associated with the first merchant from the first merchant computing device; receive preference data associated with the first merchant from the first merchant computing device; determine at least one recommendation for the first merchant based on the transaction data, the inventory data, and the preference data; and transmit the at least one recommendation to the first merchant computing device, wherein the first merchant computing device is further configured to: display the at least one recommendation to the first merchant.

Clause 33: The system of clause 32, wherein the at least one recommendation comprises at least one of a recommended price for a product in an inventory of the first merchant, a recommendation to purchase a number of products for inclusion in the inventory of the first merchant, a recommended discount offer for a product in the inventory of the first merchant, a recommended cost for a product in the inventory of the first merchant, a recommended demographic target for advertising, a recommended geographic target for advertising, a recommended new location for selling a product in the inventory of the first merchant, a recommended new type of product to purchase for inclusion in the inventory of the first merchant, a recommended new type of payment to accept, or any combination thereof.

Clause 34: The system of clause 32 or 33, wherein the transaction data associated with each payment transaction of the plurality of payment transactions comprises at least one of product identification data identifying a product, price data identifying a price of the product, merchant data identifying a merchant of the plurality of merchants, location data identifying a location of the merchant, time data identifying a time of the payment transaction, or any combination thereof.

Clause 35: The system of any one of clauses 32-34, wherein the inventory data comprises product data associated with a plurality of products, the product data associated with each product of the plurality of products comprising product identification data identifying the product.

Clause 36: The system of any one of clauses 32-35, wherein the inventory data further comprises at least one of price data identifying a price of each product of the plurality of products, cost data identifying a cost of each product of the plurality of products, source data identifying a source of each product of the plurality of products, or any combination thereof.

Clause 37: The system of any one of clauses 32-36, wherein the preference data comprises at least one of a target amount of revenue, a target amount of profit, a target number of products, a target margin between a sales price and a cost of a product, a target reduction in costs, a request for identification of a new type of product for inclusion in an inventory of the first merchant, a request for identification of a new location for selling a product in the inventory of the first merchant, or any combination thereof.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which.

DESCRIPTION

Figure 1:
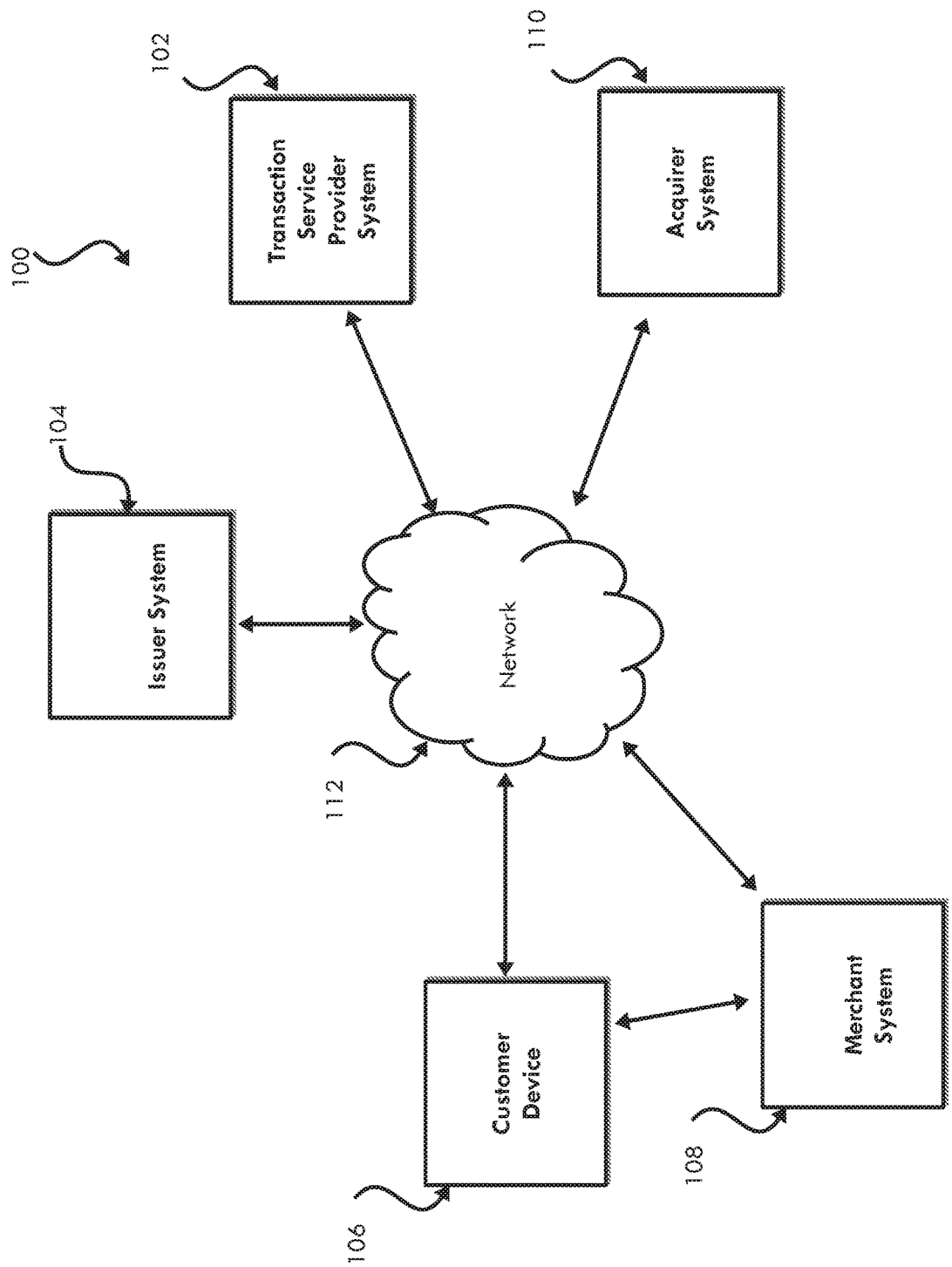
FIG. 1 is a diagram of a non-limiting embodiment or aspect of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a primary account number, a card number, a payment card number, a token, and/or the like). In some non-limiting embodiments or aspects, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments or aspects, a payment token may be "format preserving" and may have a numeric format that conforms to the account identifiers used in existing payment processing networks (e.g., ISO 8583 financial transaction message format). In some non-limiting embodiments or aspects, a payment token may be used in place of a PAN to initiate, authorize, settle, or resolve a payment transaction or represent the original credential in other systems where the original credential would typically be provided. In some non-limiting embodiments or aspects, a token value may be generated such that the recovery of the original PAN or other account identifier from the token value may not be computationally derived (e.g., with a one-way hash or other cryptographic function). Further, in some non-limiting embodiments or aspects, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments or aspects, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments or aspects, a requestor may interface with a network token system through any suitable communication network and/or protocol (e.g., using HTTPS, SOAP and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments or aspects, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments or aspects, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments or aspects, token requestor identifiers may be revoked and/or token requestors may be assigned new token requestor identifiers. In some non-limiting embodiments or aspects, this information may be subject to reporting and audit by the token service provider.

As used herein, the term a "token service provider" may refer to an entity including one or more server computers in a token service system that generates, processes and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments or aspects, the token service provider may have the ability to set aside licensed Bank Identification Numbers (BINs) as token BINs to issue tokens for the PANs that may be submitted to the token service provider. In some non-limiting embodiments or aspects, various entities of a tokenization ecosystem may assume the roles of the token service provider. For example, payment networks and issuers or their agents may become the token service provider by implementing the token services according to non-limiting embodiments or aspects of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments or aspects, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments or aspects, the token vault may be a part of a token service system. For example, the token vault may be provided as a part of the token service provider. Additionally or alternatively, the token vault may be a remote repository accessible by the token service provider. In some non-limiting embodiments or aspects, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, "merchant system" may refer to one or more computer systems operated by or on behalf of a merchant, such as a server computer executing one or more software applications. As used herein, the term "product" may refer to one or more goods and/or services offered by a merchant.

As used herein, a "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments or aspects of the disclosed subject matter are directed to systems, methods, and computer program products for providing product data to a user, including, but not limited to, providing product data based on database queries. For example, non-limiting embodiments of the disclosed subject matter provide product data to a user based on classifying database queries, determining a product associated with the classification, and calculating a score based on potential revenue and probability of purchase of the product. Such embodiments provide techniques and systems that reduce (e.g., eliminate, decrease, and/or the like) manual efforts and reduce time spent by such customers searching for, identifying, and/or the like such products and/or services. Additionally or alternatively, such embodiments provide techniques and systems that identify products and/or services that may be useful, desirable, and/or the like for customers, who may be otherwise unaware of such products and/or services. Additionally or alternatively, such embodiments provide techniques and systems that reduce (e.g., eliminate, decrease, and/or the like) manual efforts and reduce time spent by providers of such products and/or services in identifying customers for such products and/or services. Additionally or alternatively, such embodiments provide techniques and systems that enable a provider of such products and/or services to communicate with customers (e.g., transmit to customers, notify customers, recommend to customers, contact customers, and/or the like) regarding products and/or services in an suitable manner based on a quantifiable score, which may be associated with relevance of the products and/or services to the customers.

Non-limiting embodiments or aspects of the disclosed subject matter are directed to systems, methods, and computer program products for providing at least one recommendation, including, but not limited to, providing at least one recommendation based on transaction data. For example, non-limiting embodiments of the disclosed subject matter provide at least one recommendation based on determining the recommendation(s) based on transaction data, inventory data, and preference data received from a merchant. Such embodiments provide techniques and systems that allow such a merchant (e.g., small to medium-sized merchants) to reduce (e.g., eliminate, decrease, and/or the like) manual efforts and reduce time spent monitoring and/or handling administrative aspects, including pricing (e.g., of products), inventory management (e.g., what inventory to hold), product trends (e.g., identifying the latest product trends), marketing (e.g., how and to whom products should be marketed), sales/discount offers (e.g., when to hold sales), and/or the like. Additionally or alternatively, such embodiments provide techniques and systems that allow such a merchant to take advantage of opportunities, capitalize on trends, increase revenue, increase profit, and/or the like.

For the purpose of illustration, in the following description, while the presently disclosed subject matter is described with respect to methods, systems, and computer program products for providing product data and/or recommendations, e.g., based on database queries and/or transaction data, one skilled in the art will recognize that the disclosed subject matter is not limited to the illustrative embodiments or aspects. For example, the methods, systems, and computer program products described herein may be used with a wide variety of settings, such as providing product data and/or recommendations in any setting suitable for such data and/or recommendations, e.g., internet and/or web searching, internet and/or web browsing, a social networking platform, and/or the like.

Referring now to FIG. 1, FIG. 1 is a diagram of a non-limiting embodiment or aspect of an environment 100 in which systems, products, and/or methods, as described herein, may be implemented. As shown in FIG. 1, environment 100 includes transaction service provider system 102, issuer system 104, customer device 106, merchant system 108, acquirer system 110, and network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider as described herein. In some non-limiting embodiments or aspects, transaction service provider system 102 may be in communication with a data storage device, which may be local or remote to transaction service provider system 102. In some non-limiting embodiments or aspects, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via network 112. Additionally or alternatively, each customer device 106 may include a device capable of receiving information from and/or communicating information to other customer devices 106 via network 112, another network (e.g., an ad hoc network, a local network, a private network, a virtual private network, and/or the like), and/or any other suitable communication technique. For example, customer device 106 may include a client device and/or the like. In some non-limiting embodiments or aspects, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via the network, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more client devices. For example, merchant system 108 may include a client device that allows a merchant to communicate information to transaction service provider system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments or aspects, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
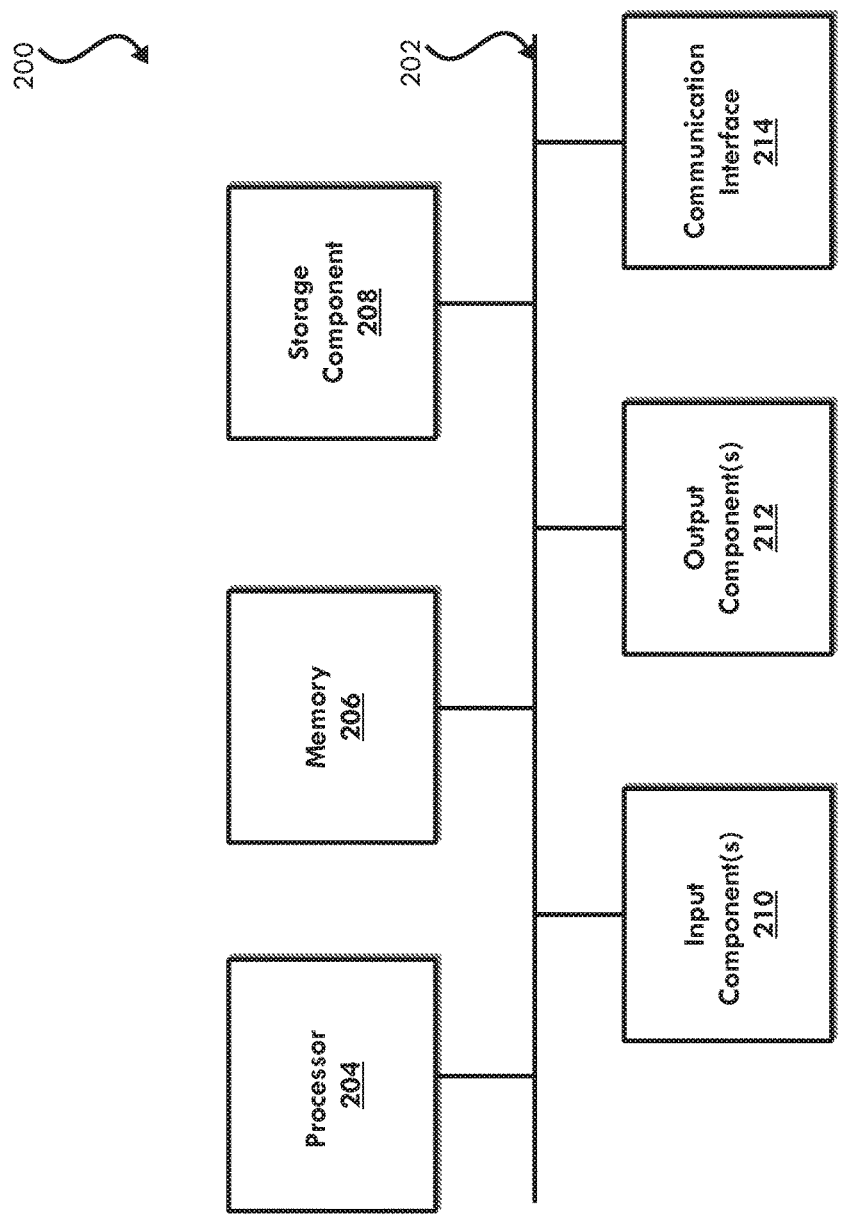
FIG. 2 is a diagram of a non-limiting embodiment or aspect of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments or aspects, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
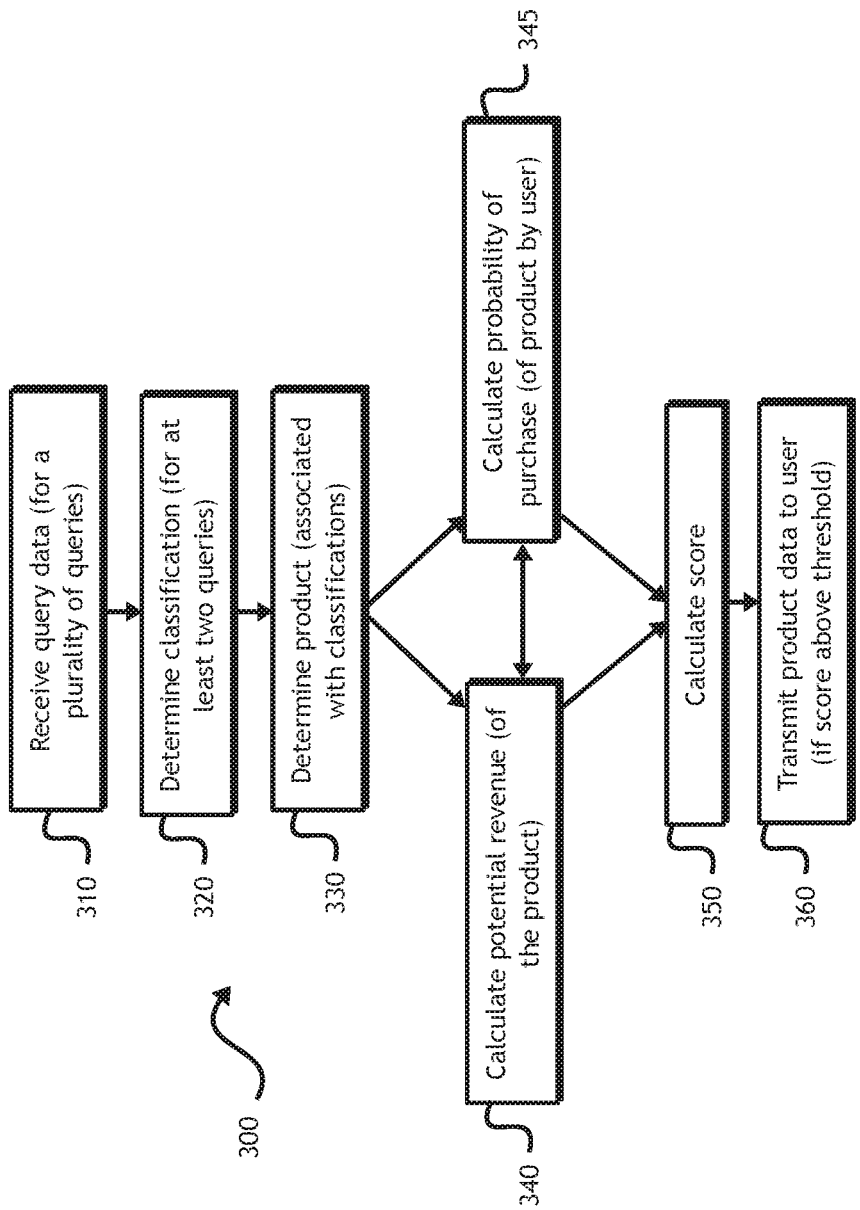
FIG. 3 is a flowchart of a non-limiting embodiment or aspect of a process for providing product data to a user according to the principles of the presently disclosed subject matter.

Referring now to FIG. 3, FIG. 3 is a flowchart of a non-limiting embodiment or aspect of a process 300 for providing product data to a user. In some non-limiting embodiments or aspects, one or more of the steps of process 300 may be performed (e.g., completely, partially, and/or the like) by transaction service provider system 102 (e.g., one or more devices of transaction service provider system 102). In some non-limiting embodiments or aspects, one or more of the steps of process 300 may be performed (e.g., completely, partially, and/or the like) by another system, another device, another group of systems, or another group of devices, separate from or including transaction service provider system 102, such as merchant system 108 (e.g., one or more devices of merchant system 108), issuer system 104 (e.g., one or more devices of issuer system 104), customer device 106, and/or acquirer system 110 (e.g., one or more devices of acquirer system 110). In some non-limiting embodiments or aspects, with reference to FIG. 3, a first computing device may be the same as or similar to one or more devices of merchant system 108. Additionally or alternatively, a second computing device may be the same as or similar to one or more devices of transaction service provider system 102.

As shown in FIG. 3, at step 310, process 300 may include receiving, with at least one processor, query data associated with a plurality of queries of a database by a user. For example, a user (e.g., a merchant or an employee or representative thereof) may use a first computing device (e.g., one or more devices of merchant system 108) to query a database (e.g., of transaction service provider system 102). In some non-limiting embodiments or aspects, the queries may be made through a portal (e.g., a merchant portal provided by the transaction service provider system 102) and/or an application programming interface (API) connecting the first computing device (e.g., one or more devices of merchant system 108) to the database (e.g., of transaction service provider system 102). For example, a portal may include at least one of Cybersource Enterprise Business Center (EBC), Authorize.net (ANET) Merchant Interface (MINT), Partner Interface (PINT), or Reseller Interface (RINT), and/or the like. In some non-limiting embodiments or aspects, the queries may include standardized and/or periodical reports or portions thereof. Additionally or alternatively, the queries may include custom and/or ad hoc queries generated by the user and/or first computing device.

In some non-limiting embodiments or aspects, queries (e.g., of a merchant through an API) of a database may lead to an understanding of not only the specific merchant but also trends in industries or the merchants worldwide. Additionally or alternatively, specific (e.g., ad hoc or customer) queries may provide greater insight than standardized reports. In some non-limiting embodiments or aspects, query data (e.g., records and/or logs of the queries) may be generated and/or stored for each query.

In some non-limiting embodiments or aspects, the user (e.g., a merchant or an employee or representative thereof) may provide user data associated with the user and/or user category data associated with a category of the user. For example, user data may include at least one of user identification data identifying the user, location data identifying a location of the user, user revenue data associated with a revenue of the user, user size data associated with a size of the user, transaction data associated with a plurality of payment transactions from the user, purchase history data associated with purchases previously made by the user, any combination thereof, and/or the like. Additionally or alternatively, user category data may include at least one of category code data identifying the category code of the user, other user identification data identifying other users associated with the category of the user, other user purchase history data associated with purchases previously made by the other users in the category, any combination thereof, and/or the like.

As shown in FIG. 3, at step 320, process 300 may include determining a classification for at least two queries of the plurality of queries. For example, a second computing device (e.g., one or more devices of transaction service provider system 102) may determine a classification of each query. In some non-limiting embodiments or aspects, the second computing device (e.g., one or more devices of transaction service provider system 102) may determine at least one field (e.g., variable, value, piece of data, property, data member, and/or the like) associated with each query. Additionally or alternatively, each field may have a predetermined/predefined association with at least one classification. For example, each query may have at least one classification, which may be determined based on the fields associated therewith.

In some non-limiting embodiments or aspects, each query may be analyzed and put into at least one product bucket. For example, each product bucket may be a classification associated with a product (e.g., offered by the transaction service provider).

As shown in FIG. 3, at step 330, process 300 may include determining a product based on the classification(s). For example, a second computing device (e.g., one or more devices of transaction service provider system 102) may determine a product associated with the classification of the at least two queries of the plurality of queries. In some non-limiting embodiments or aspects, each classification may be associated with at least one product. Additionally or alternatively, at least some classifications may each be associated with a particular product. In some non-limiting embodiments or aspects, the queries may be associated with a plurality of classifications, and the product may be determined based on which product is associated with all of, most of, or the greatest number of the classifications. In some non-limiting embodiments or aspects, when the queries are classified into product buckets, the product may be determined by which product bucket has a greatest number of queries or frequency of queries (e.g., in a predetermined or selectable time period).

In some non-limiting embodiments or aspects, the classifications may be applicable to any product. For the purpose of illustration, if a user (e.g., a merchant or an employee or representative thereof)) repeatedly and/or consistently queries about how many errors have been received from expired account identifiers and/or financial instruments, such queries may be classified as associated with a product that checks to see if an account identifiers/financial instruments has expired and, if so, whether there is a new one to use so the user merchant can successfully complete the transaction (e.g., Visa® Account Updater). Additionally or alternatively, if a user is repeatedly and/or consistently querying about fraud rates, the queries may be classified as associated with a product relating to fraud detection/prevention/management (e.g., CyberSource® Decision Manager). Additionally or alternatively, if a user is repeatedly and/or consistently querying about acceptance rates in specific countries, such queries may be classified as associated with analytics consulting.

As shown in FIG. 3, at step 340, process 300 may include calculating a potential revenue associated with the product. For example, a second computing device (e.g., one or more devices of transaction service provider system 102) may calculate the potential revenue associated with each product associated with the classification(s) of the queries based on the user. In some non-limiting embodiments or aspects, the potential revenue calculation may be based on the user data, the user category data, and a cost of the product. Additionally or alternatively, the potential revenue calculation may be based on statistical analysis, analytics, whitespace analysis, and/or the like.

As shown in FIG. 3, at step 345, process 300 may include calculating, with the at least one processor, a probability that the user will purchase the product. For example, a second computing device (e.g., one or more devices of transaction service provider system 102) may calculate the probability that the user will purchase the product based on the user. In some non-limiting embodiments or aspects, the probability that the user will purchase the product may be calculated based on the user data, the user category data, and a cost of the product. Additionally or alternatively, the probability that the user will purchase the product may be calculated based on historical data regarding the user stored in a database (e.g., a client relations manager (CRM) and/or the like).

As shown in FIG. 3, at step 350, process 300 may include calculating a score based on the potential revenue and the probability that the user will purchase the product. For example, a second computing device (e.g., one or more devices of transaction service provider system 102) may calculate the score based on the potential revenue and the probability that the user will purchase the product. In some non-limiting embodiments or aspects, each product associated with each classification (e.g., product bucket) may be analyzed to determine what markers indicate a propensity to buy (e.g., probability that the user will purchase the product based on historical data in the CRM) and the potential revenue amount (e.g., whitespace analysis), as described herein. Additionally or alternatively, each product associated with each classification (e.g., product bucket) may be analyzed to determine the most effective medium for informing the user of the product.

As shown in FIG. 3, at step 360, process 300 may include communicated (e.g., transmitting) product data associated with the product to the user. For example, a second computing device (e.g., one or more devices of transaction service provider system 102) may transmit product data associated with the product to the first computing device (e.g., one or more devices of merchant system 108) if the score exceeds the threshold. In some non-limiting embodiments or aspects, higher scoring (e.g., with a score above a first threshold) users (e.g., merchants) may have an opportunity created in the CRM. Additionally or alternatively, lower scoring (e.g., score between a first threshold and a second threshold, wherein the second threshold is less than the first threshold) users (e.g., merchants) may have a whitepaper added into a portal (e.g., MINT, Merchant Portal (MP), and/or the like). For example, such a message and/or like associated with the whitepaper may pop up when the merchant logs in (e.g., a highlighted link a section labeled "New," "Notifications," and/or the like).

In some non-limiting embodiments or aspects, as knowledge regarding what users (e.g., merchants) are querying increases (e.g., the number of classified queries increases), merchant profiles may be created around the types of queries being made (e.g., based on the classifications). Additionally or alternatively, based on what other users (e.g., other merchant profiles, similar merchant profiles, typical merchant profiles, and/or the like) have asked, suggestions (e.g., messages, links, and/or the like) may be provided regarding whitepapers, reports, and suggested queries (e.g., frequently asked queries, top queries, and/or the like), which may be of interest to the user. In some non-limiting embodiments or aspects, the more the users (e.g., merchants) that use the ad hoc query tool, the more service providers (e.g., transaction service providers) may understand what the users' needs are, what products may be of interest to help them, and how to build a more effective set of merchant profiles that enable selling across the entire platform (e.g., interrelated products based on user needs). In some non-limiting embodiments or aspects, data collected from one user (e.g., merchant) may be used to help recommend products not just to that user but also other users on the platform/system.

Figure 4:
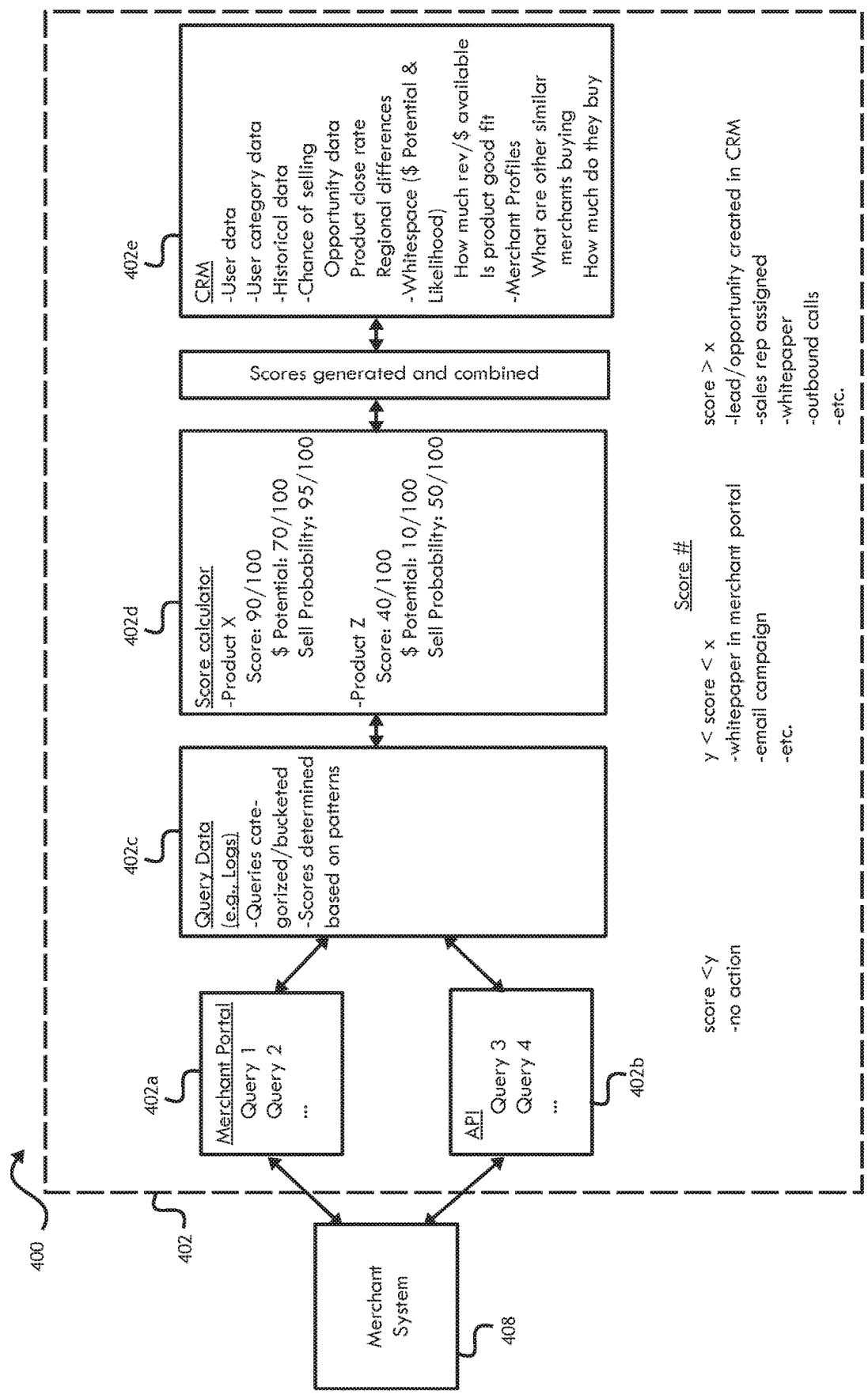
FIG. 4 is a diagram of a non-limiting embodiment or aspect of an implementation of a non-limiting embodiment or aspect of the process shown in FIG. 3.

Referring now to FIG. 4, FIG. 4 is a diagram of an exemplary implementation 400 of a non-limiting embodiment or aspect relating to process 300 shown in FIG. 3. As shown in FIG. 4, implementation 400 may include first computing device 408 and second computing device 402. In some non-limiting embodiments or aspects, first computing device 408 may be the same as or similar to one or more devices of merchant system 108. Additionally or alternatively, in some non-limiting embodiments or aspects, second computing device 402 may be the same as or similar to one or more devices of transaction service provider system 102.

In some non-limiting embodiments or aspects, first computing device 408 may transmit query data 402c associated with a plurality of queries of a database by a user, as described herein. For example, queries may be made through merchant portal 402a (e.g., a merchant portal provided by second computing device 402) and/or an API 402b connecting first computing device 408 to second computing device 402 (e.g., a database of second computing device 402), as described herein. In some non-limiting embodiments or aspects, first computing device 408 may provide/transmit user data associated with the user and user category data associated with a category of the user to second computing device 402 (e.g., CRM 402e of second computing device 402), as described herein.

In some non-limiting embodiments or aspects, second computing device 402 may receive (and/or store) the query data 402c associated with the plurality of queries of the database by the user, as described herein. Additionally or alternatively, second computing device 402 may determine a classification (e.g., bucket) for at least two queries of the plurality of queries, as described herein. Additionally or alternatively, second computing device 402 may determine a product associated with the classification of the at least two queries of the plurality of queries In some non-limiting embodiments or aspects, second computing device 402 (e.g., score calculator 402d of second computing device 402) may calculate a potential revenue associated with the product based on the user, as described herein. Additionally or alternatively, second computing device 402 (e.g., score calculator 402d of second computing device 402) may calculate a probability that the user will purchase the product, as described herein. In some non-limiting embodiments or aspects, second computing device 402 may calculate a score based on the potential revenue and the probability that the user will purchase the product.

In some non-limiting embodiments or aspects, second computing device 402 may receive (and/or store) the user data, user category data, historical data, statistical analysis, analytics, whitespace analysis, and/or the like associated with a user (e.g., of first computing device 408), as described herein. For example, CRM 402e of second computing device 402 may receive and/or store such information.

In some non-limiting embodiments or aspects, second computing device 402 may transmit product data associated with the product to first computing device 408 if the score exceeds a threshold, as described herein. Additionally or alternatively, first computing device 408 may receive the product data associated with the product, as described herein. In some non-limiting embodiments or aspects, first computing device 408 may display the product data to the user, as described herein.

Figure 5:
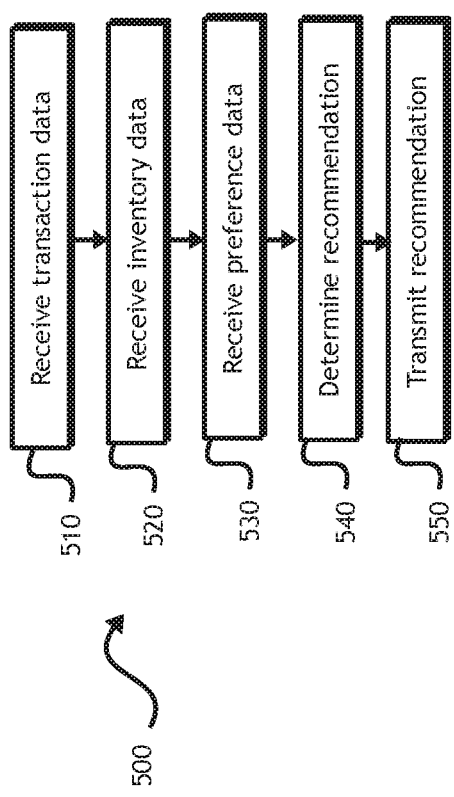
FIG. 5 is a flowchart of a non-limiting embodiment or aspect of a process for providing at least one recommendation to a user according to the principles of the presently disclosed subject matter.

Referring now to FIG. 5, FIG. 5 is a flowchart of a non-limiting embodiment or aspect of a process 500 for providing product data to a user. In some non-limiting embodiments or aspects, one or more of the steps of process 500 may be performed (e.g., completely, partially, and/or the like) by transaction service provider system 102 (e.g., one or more devices of transaction service provider system 102). In some non-limiting embodiments or aspects, one or more of the steps of process 500 may be performed (e.g., completely, partially, and/or the like) by another system, another device, another group of systems, or another group of devices, separate from or including transaction service provider system 102, such as merchant system 108 (e.g., one or more devices of merchant system 108), issuer system 104 (e.g., one or more devices of issuer system 104), customer device 106, and/or acquirer system 110 (e.g., one or more devices of acquirer system 110). In some non-limiting embodiments or aspects, with reference to FIG. 5, a first computing device may be the same as or similar to one or more devices of merchant system 108. Additionally or alternatively, a second computing device may be the same as or similar to one or more devices of transaction service provider system 102.

As shown in FIG. 5, at step 510, process 500 may include receiving transaction data associated with a plurality of payment transactions from a plurality of merchants. In some non-limiting embodiments or aspects, a second computing device (e.g., one or more devices of transaction service provider system 102) may receive the transaction data from a plurality of first computing devices (e.g., one or more devices of a plurality of merchant systems 108). For example, the first computing devices (e.g., one or more devices of merchant systems 108) may communicate (e.g., transmit) transaction data to a second computing device (e.g., one or more devices of transaction service provider system 102).

In some non-limiting embodiments or aspects, the transaction data associated with each payment transaction of the plurality of payment transactions may include at least one of product identification data identifying a product, price data identifying a price of the product, merchant data identifying a merchant of the plurality of merchants, location data identifying a location of the merchant, time data identifying a time of the payment transaction, and/or the like.

As shown in FIG. 5, at step 520, process 500 may include receiving inventory data associated with a first merchant of the plurality of merchants. In some non-limiting embodiments or aspects, a second computing device (e.g., one or more devices of transaction service provider system 102) may receive the inventory data from one of the first computing devices (e.g., one or more devices of a merchant systems 108) associated with the first merchant. For example, the first computing device associated with the first merchant may communicate (e.g., transmit) the inventory data to the second computing device.

In some non-limiting embodiments or aspects, the inventory data may include product data associated with a plurality of products. Additionally or alternatively, the product data may include product identification data identifying the product. In some non-limiting embodiments or aspects, the inventory data may further include price data identifying a price of each product of the plurality of products, cost data identifying a cost of each product of the plurality of products, and source data identifying a source of each product of the plurality of products.

As shown in FIG. 5, at step 530, process 500 may include receiving preference data associated with the first merchant of the plurality of merchants. In some non-limiting embodiments or aspects, a second computing device (e.g., one or more devices of transaction service provider system 102) may receive the preference data from one of the first computing devices (e.g., one or more devices of a merchant systems 108) associated with the first merchant. For example, the first computing device associated with the first merchant may communicate (e.g., transmit) the preference data to the second computing device.

In some non-limiting embodiments or aspects, the preference data may include at least one of a target amount of revenue, a target amount of profit, a target number of products, a target margin between a sales price and a cost of a product, a target reduction in costs, a request for identification of a new type of product for inclusion in an inventory of the first merchant, a request for identification of a new location for selling a product in the inventory of the first merchant, and/or the like.

As shown in FIG. 5, at step 540, process 500 may include determining at least one recommendation for the first merchant. For example, a second computing device (e.g., one or more devices of transaction service provider system 102) may determine at least one recommendation for the first merchant based on the transaction data, the inventory data, and/or the preference data. In some non-limiting embodiments or aspects, the recommendation(s) may include at least one of the following: a recommended price for a product in an inventory of the first merchant, a recommendation to purchase a number of products for inclusion in the inventory of the first merchant, a recommended discount offer for a product in the inventory of the first merchant, a recommended cost for a product in the inventory of the first merchant, a recommended demographic target for advertising, a recommended geographic target for advertising, a recommended new location for selling a product in the inventory of the first merchant, a recommended new type of product to purchase for inclusion in the inventory of the first merchant, a recommended new type of payment to accept, any combination thereof, and/or the like.

In some non-limiting embodiments or aspects, a series of algorithms may be used to determine the recommendation. For example, such algorithms may focus on several areas, and each area may be deployed as a module, which the merchant can turn on/off or allow varying degrees of functionality. In some non-limiting embodiments or aspects, the modules may include at least one of pricing, forecasting, inventory management, marketing analysis, gap analysis, any combination thereof, and/or the like, as further described below.

In some non-limiting embodiments or aspects, a first module may include a pricing module. For example, such a pricing module may provide pre-aggregated average pricing by geography, segment, merchant category, and/or the like at a product level across all merchants using the platform/system. In some non-limiting embodiments or aspects, products may be bucketed into higher level categories to expand usefulness. In some non-limiting embodiments or aspects, the pricing module (e.g., the second computing device) may determine what products are being sold where, when, how many, at what price, and/or the like. Additionally or alternatively, the pricing module (e.g., the second computing device) may determine what attributes that each category/bucket (e.g., specific services being bucketed as higher-level more generic) has. In some non-limiting embodiments or aspects, each user's (e.g., merchant's) own product list may be matched against what other similar users (e.g., merchants) are selling. Additionally or alternatively, the pricing module (e.g., the second computing devices) may determine a suggested price depending on the below modules/variables.

In some non-limiting embodiments or aspects, a second module may include a forecasting module. In some non-limiting embodiments or aspects, once a user (e.g., merchant) defines/provides specific preferences/goals (e.g., by company, such as maximize revenue/profit, or by products, such as sell all inventory of Product X), the forecast module may determine pricing (e.g., optimized pricing) to achieve those goals given the available inventory, seasonality, and other available factors.

In some non-limiting embodiments or aspects, a third module may include an inventory management module. In some non-limiting embodiments or aspects, the inventory module may gather (e.g., receive) information/data from the merchant base (e.g., users of the system/platform). Based thereon, the inventory management module may determine trends, e.g., what a typical merchant with a given profile is selling or the profile the user wishes to be (e.g., smaller merchant wishes to be a larger multi-regional merchant). Additionally or alternatively, trends and/or fads (e.g., fidget spinners) may be identified/determined, and the users (e.g., merchants) may follow the trend in popularity while shedding inventory ahead of the downward curve. Additionally or alternatively, once users (e.g., merchants) provide/select cost in order to maximize profit, the inventory management module may use that data to enable a price negotiation component to allow users (e.g., merchants) to understand what others are paying for specific products.

In some non-limiting embodiments or aspects, a fourth module may include a marketing analysis module. In some non-limiting embodiments or aspects, the marketing analysis module may determine what products are being purchased based on demographic/geographic information/data, and that data may be communicated/provided to an advertising platform (e.g., Visa® Marketing Ads platform) to specifically target consumers (e.g., purchase ads on websites, search engines, social media sites, apps, and/or the like). Additionally or alternatively, the marketing analysis module may determine popularity of specific products, may identify/determine complementary products (e.g., a game console, such as Xbox One, may be complementary with games therefor, such as Xbox One games), may determine potential market saturation (e.g., based on geographic analysis of slowdowns per capita), and/or may apply that logic to more effectively target consumers, which may reduce marketing spending and increasing overall revenue for the user (e.g., the merchant).

In some non-limiting embodiments or aspects, a fifth module may include a gap analysis module (e.g., overall gap analysis module). In some non-limiting embodiments or aspects, the gap analysis module may determine/provide offer suggestions/gap analysis regarding payment types, advertising space/region, inventory types (e.g., other users are selling Product X, but you are not), and/or the like.

In some non-limiting embodiments or aspects, the aforementioned modules may be used in combination. For example, the pricing module may be used to manage the user's (e.g., merchant's) pricing for optimal results based on the user's preferences (e.g., profit, revenue, inventory turnover, and/or the like), and that pricing may be fed to the forecasting module to predict annual revenue, to the gap analysis module to determine the best time for sales, to the inventory module to determine what inventory to stock up and what inventory to move, and/or to the marketing analysis module to continually profile customers across the system/platform to determine where and how marketing budgets are best spent.

In some non-limiting embodiments or aspects, which modules are enabled and the level of integration thereof may be based on selections/settings providing by/received from the user (e.g., merchant). For example, each module may include/be associated with a selectable graphical element (e.g., a button, a checkbox, and/or the like) which may be enabled to turn on the module or disabled to turn off the module. Additionally, the merchant may provide preference data (e.g., certain revenue/profit targets), as described herein, which may be used to customize one or more of the modules depending on the user's (e.g., merchant's) desired involvement.

In some non-limiting embodiments or aspects, the level of effort involved for the user (e.g., merchant) may depend on the underlying platforms that the user is using. For example, certified and/or affiliated platforms (e.g., Visa®/CyberSource®) and/or partner platforms may be designed to work with or have an API to integrate with the aforementioned modules (e.g., the least amount of effort by the user). In some non-limiting embodiments or aspects, full integration may require syncing with pricing, inventory, marketing, and/or other systems employed by the user. In some non-limiting embodiments or aspects, fields used and/or returned by the modules may be standardized. For example, standardized fields may allow for easier integration with other platforms so that data may be shared, mined, and/or aggregated into the modules to increase the accuracy of underlying models. As such, the system/platform may be a great improvement in efficiency and accuracy while reducing work load/effort required by the user.

As shown in FIG. 5, at step 550, process 500 may include transmitting the at least one recommendation to the first merchant. In some non-limiting embodiments or aspects, a second computing device (e.g., one or more devices of transaction service provider system 102) may communicate (e.g., transmit) the recommendation(s) to the one of the first computing devices (e.g., one or more devices of a merchant systems 108) associated with the first merchant. Additionally or alternatively, the recommendation(s) may be displayed to the user. For example, the one of the first computing devices (e.g., one or more devices of a merchant system 108) associated with the first merchant may display the recommendation(s).

Figure 6:
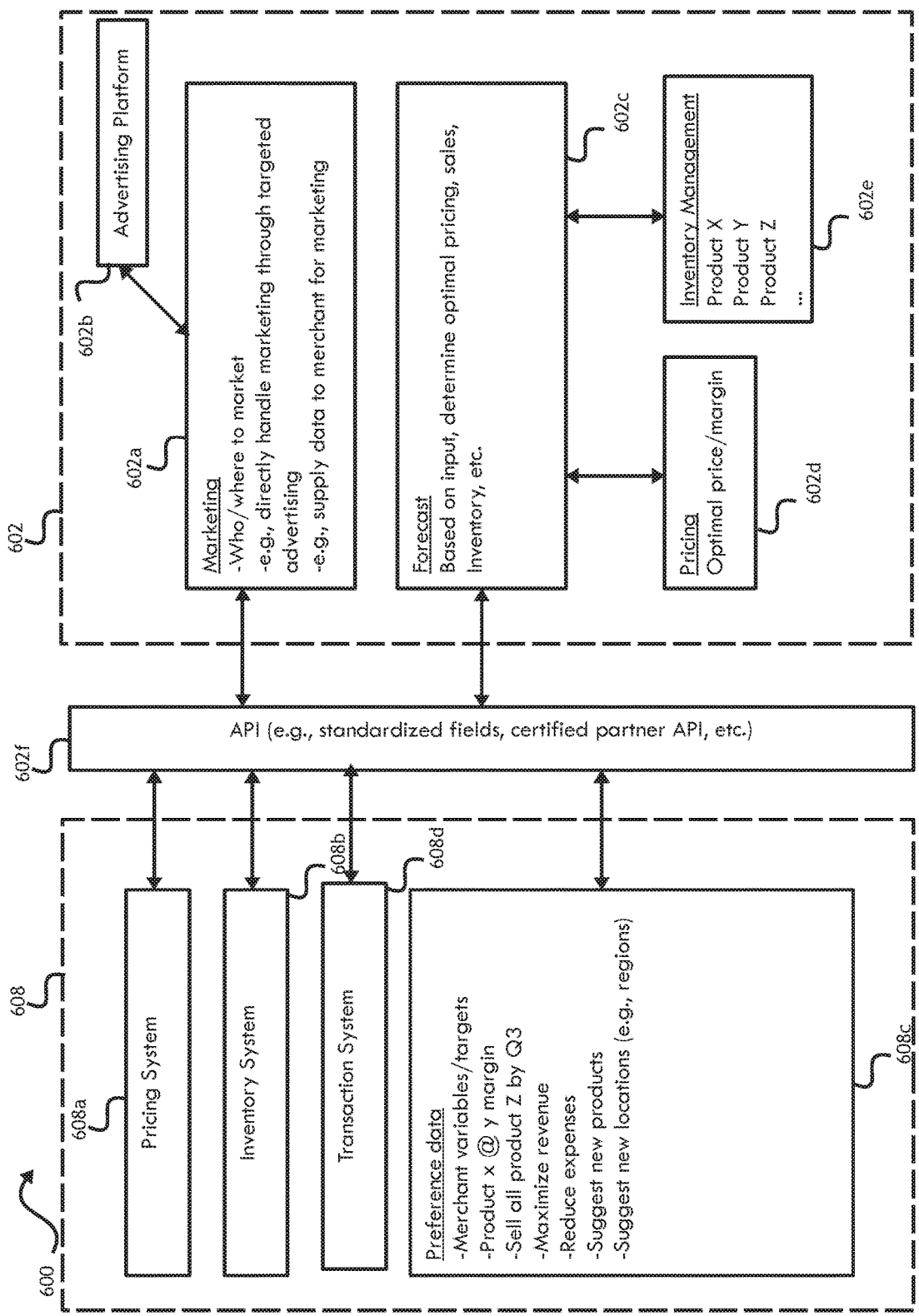
FIG. 6 is a diagram of a non-limiting embodiment or aspect of an implementation of a non-limiting embodiment or aspect of the process shown in FIG. 5.

Referring now to FIG. 6, FIG. 6 is a diagram of an exemplary implementation 600 of a non-limiting embodiment or aspect relating to process 500 shown in FIG. 5. As shown in FIG. 6, implementation 600 may include at least one first computing device 608 and second computing device 602. In some non-limiting embodiments or aspects, first computing device 608 may be the same as or similar to one or more devices of merchant system 108. Additionally or alternatively, in some non-limiting embodiments or aspects, second computing device 602 may be the same as or similar to one or more devices of transaction service provider system 102.

In some non-limiting embodiments or aspects, there may be a plurality of first computing devices 608 (e.g., a plurality of merchant computing devices of a plurality of merchants). Additionally or alternatively, first computing devices 608 may communicate transaction data associated with a plurality of payment transactions (e.g., one or more transactions from each first computing device 608), as described herein. In some non-limiting embodiments or aspects, the transaction data may be provided (e.g., stored, communicated, and/or the like) by transaction system 608d of the first computing device 608. For example, transaction system 608d may include a POS system, payment terminal, and/or the like as described herein. In some non-limiting embodiments or aspects, transaction data may include at least one of product identification data identifying a product, price data identifying a price of the product, merchant data identifying a merchant of the plurality of merchants, location data identifying a location of the merchant, time data identifying a time of the payment transaction, any combination thereof, and/or the like. In some non-limiting embodiments or aspects, at least some of the transaction data (e.g., product identification data, price data, and/or the like) may be provided (e.g., stored, communicated, and/or the like) by pricing system 608*a* of the first computing device 608. Additionally or alternatively, at least some of the transaction data (e.g., product identification data, price data, merchant data, location data, time data, and/or the like) may be provided (e.g., stored, communicated, and/or the like) by inventory system 608*b* of first computing device 608.

In some non-limiting embodiments or aspects, one of the first computing devices 608 may include a first merchant computing device of a first merchant. That first computing device 608 may further communicate inventory data associated with the first merchant, as described herein. For example, inventory system 608*b* of that first computing device 608 may communicate the inventory data. Additionally or alternatively, that first computing device 608 may communicate preference data 608*c* associated with the first merchant, as described herein.

In some non-limiting embodiments or aspects, first computing device(s) 608 and second computing device 602 may communicate via API 602*f*, as described herein.

In some non-limiting embodiments or aspects, second computing device 602 may receive transaction data associated with the plurality of payment transactions from the plurality of first computing devices 608, as described herein. Additionally or alternatively, second computing device 602 may receive inventory data associated with the first merchant from the one of the first computing devices 608 associated with the first merchant, as described herein. Additionally or alternatively, second computing device 602 may receive preference data 608*c* associated with the first merchant from the one of the first computing devices 608 associated with the first merchant, as described herein.

In some non-limiting embodiments or aspects, second computing device 602 may determine at least one recommendation for the first merchant based on the transaction data, the inventory data, and the preference data, as described herein. Additionally or alternatively, second computing device 602 may transmit the recommendation(s) to the one of the first computing devices 608 associated with the first merchant, as described herein.

In some non-limiting embodiments or aspects, a series of algorithms may be used to determine the recommendation. For example, such algorithms may focus on several areas, and each area may be deployed as a module (e.g., marketing module 602*a*, forecasting module 602*c*, pricing module 602*d*, inventory management module 602*e*, and/or the like), which the merchant can turn on/off or allow varying degrees of functionality, as describe herein. In some non-limiting embodiments or aspects, the modules may include at least one of pricing (e.g., pricing module 602*d*), forecasting (e.g., forecasting module 602*c*), inventory management (e.g., inventory management module 602*e*), marketing analysis (e.g., marketing module 602*a*), gap analysis, any combination thereof, and/or the like, as described herein. In some non-limiting embodiments, marketing module 602*a* may communicate with advertising platform 602*b*.

In some non-limiting embodiments or aspects, the one of the first computing devices 608 associated with the first merchant may receive the recommendation(s) from second computing device 602. Additionally or alternatively, that first computing device 608 may display the recommendation(s) to the first merchant, as described herein.

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A method for providing product data to a first merchant, comprising:
    receiving, with at least one processor, transaction data associated with a plurality of payment transactions from a plurality of merchants;
    receiving, with the at least one processor, query data associated with a plurality of queries of a database by the first merchant;
    determining, with the at least one processor, a classification for at least two queries of the plurality of queries;
    determining, with the at least one processor, a product associated with the classification of the at least two queries of the plurality of queries;
    determining, with the at least one processor, price data of the product based on the transaction data associated with the plurality of payment transactions from the plurality of merchants;
    determining, with the at least one processor, a price of the product based on the price data;
    calculating, with the at least one processor, a potential profit associated with a sale of the product by the first merchant based on the price of the product;
    calculating, with the at least one processor, a probability that the first merchant will purchase the product;
    calculating, with the at least one processor, a score based on the potential profit and the probability that the first merchant will purchase the product; and
    transmitting, with the at least one processor, product data associated with the product to the first merchant if the score exceeds a threshold.

2. The method of claim 1, further comprising receiving user data associated with the first merchant and user category data associated with a category of the first merchant.

3. The method of claim 2, wherein the probability that the first merchant will purchase the product is calculated based on the user data, the user category data, and a cost of the product.

4. The method of claim 2, wherein the potential profit is calculated based on the user data, the user category data, and a cost of the product.

5. The method of claim 2, wherein user data comprises at least one of user identification data identifying the first merchant, location data identifying a location of the first merchant, user revenue data associated with a revenue of the first merchant, user size data associated with a size of the first merchant, transaction data associated with a plurality of payment transactions from the first merchant, purchase history data associated with purchases previously made by the first merchant, or any combination thereof.

6. The method of claim 2, wherein the user category data comprises at least one of category code data identifying a category code of the first merchant, other user identification data identifying other merchants associated with the category of the first merchant, other user purchase history data associated with purchases previously made by the other merchants in the category, or any combination thereof.

7. A computer program product for providing product data to a first merchant, the computer program product comprising at least one non-transitory computer-readable medium including one or more instructions that, when executed by at least one processor, cause the at least one processor to:

receive transaction data associated with a plurality of payment transactions from a plurality of merchants;

receive query data associated with a plurality of queries of a database by the first merchant;

determine a classification for at least two queries of the plurality of queries;

determine a product associated with the classification of the at least two queries of the plurality of queries;

determine price data of the product based on the transaction data associated with the plurality of payment transactions from the plurality of merchants;

determine a price of the product based on the price data;

calculate a potential profit associated with sale of the product by the first merchant based on the price of the product;

calculate a probability that the first merchant will purchase the product;

calculate a score based on the potential profit and the probability that the first merchant will purchase the product; and transmit product data associated with the product to the first merchant if the score exceeds a threshold.

8. The computer program product of claim 7, wherein the one or more instructions further cause the at least one processor to receive user data associated with the first merchant and user category data associated with a category of the first merchant.

9. The computer program product of claim 8, wherein the probability that the first merchant will purchase the product is calculated based on the user data, the user category data, and a cost of the product.

10. The computer program product of claim 8, wherein the potential profit is calculated based on the user data, the user category data, and a cost of the product.

11. The computer program product of claim 8, wherein user data comprises at least one of user identification data identifying the first merchant, location data identifying a location of the first merchant, user revenue data associated with a revenue of the first merchant, user size data associated with a size of the first merchant, transaction data associated with a plurality of payment transactions from the first merchant, purchase history data associated with purchases previously made by the first merchant, or any combination thereof.

12. The computer program product of claim 8, wherein the user category data comprises at least one of category code data identifying a category code of the first merchant, other user identification data identifying other merchants associated with the category of the first merchant, other user purchase history data associated with purchases previously made by the other merchants in the category, or any combination thereof.

13. A system for providing product data to a first merchant, comprising:

at least one first computing device, configured to:

transmit query data associated with a plurality of queries of a database by the first merchant; and at least one second computing device, configured to:

receive transaction data associated with a plurality of payment transactions from a plurality of merchants;

receive the query data associated with the plurality of queries of the database by the first merchant;

determine a classification for at least two queries of the plurality of queries;

determine a product associated with the classification of the at least two queries of the plurality of queries;

determine price data of the product based on the transaction data associated with the plurality of payment transactions from the plurality of merchants;

determine a price of the product based on the price data calculate a potential profit associated with a sale of the product by the first merchant based on the price of the product;

calculate a probability that the first merchant will purchase the product;

calculate a score based on the potential profit and the probability that the first merchant will purchase the product; and transmit product data associated with the product to the at least one first computing device if the score exceeds a threshold, wherein the at least one first computing device is further configured to:

receive the product data associated with the product; and display the product data to the first merchant.

14. The system of claim 13, wherein the at least one first computing device comprises a merchant computing device of a merchant system, and further wherein the at least one second computing device comprises a transaction service provider device of a transaction service provider system.

15. The system of claim 13, wherein the at least one second computing device is further configured to receive user data associated with the first merchant and user category data associated with a category of the first merchant.

16. The system of claim 15, wherein the probability that the first merchant will purchase the product is calculated based on the user data, the user category data, and a cost of the product.

17. The system of claim 15, wherein the potential profit is calculated based on the user data, the user category data, and a cost of the product.

18. The system of claim 15, wherein user data comprises at least one of user identification data identifying the first merchant, location data identifying a location of the first merchant, user revenue data associated with a revenue of the first merchant, user size data associated with a size of the first merchant, transaction data associated with a plurality of payment transactions from the first merchant, purchase history data associated with purchases previously made by the first merchant, or any combination thereof.

19. The system of claim 15, wherein the user category data comprises at least one of category code data identifying a category code of the first merchant, other user identification data identifying other merchants associated with the category of the first merchant, other user purchase history data associated with purchases previously made by the other merchants in the category, or any combination thereof.

\* \* \* \* \*